Oct. 14, 1952     M. N. WEBER     2,613,925
PNEUMATIC LOAD INDICATING DEVICE

Filed Feb. 1, 1952     2 SHEETS—SHEET 1

INVENTOR.
MILTON N. WEBER
BY Barnes, Kisselle, Laughlin & Raisch
ATTORNEYS.

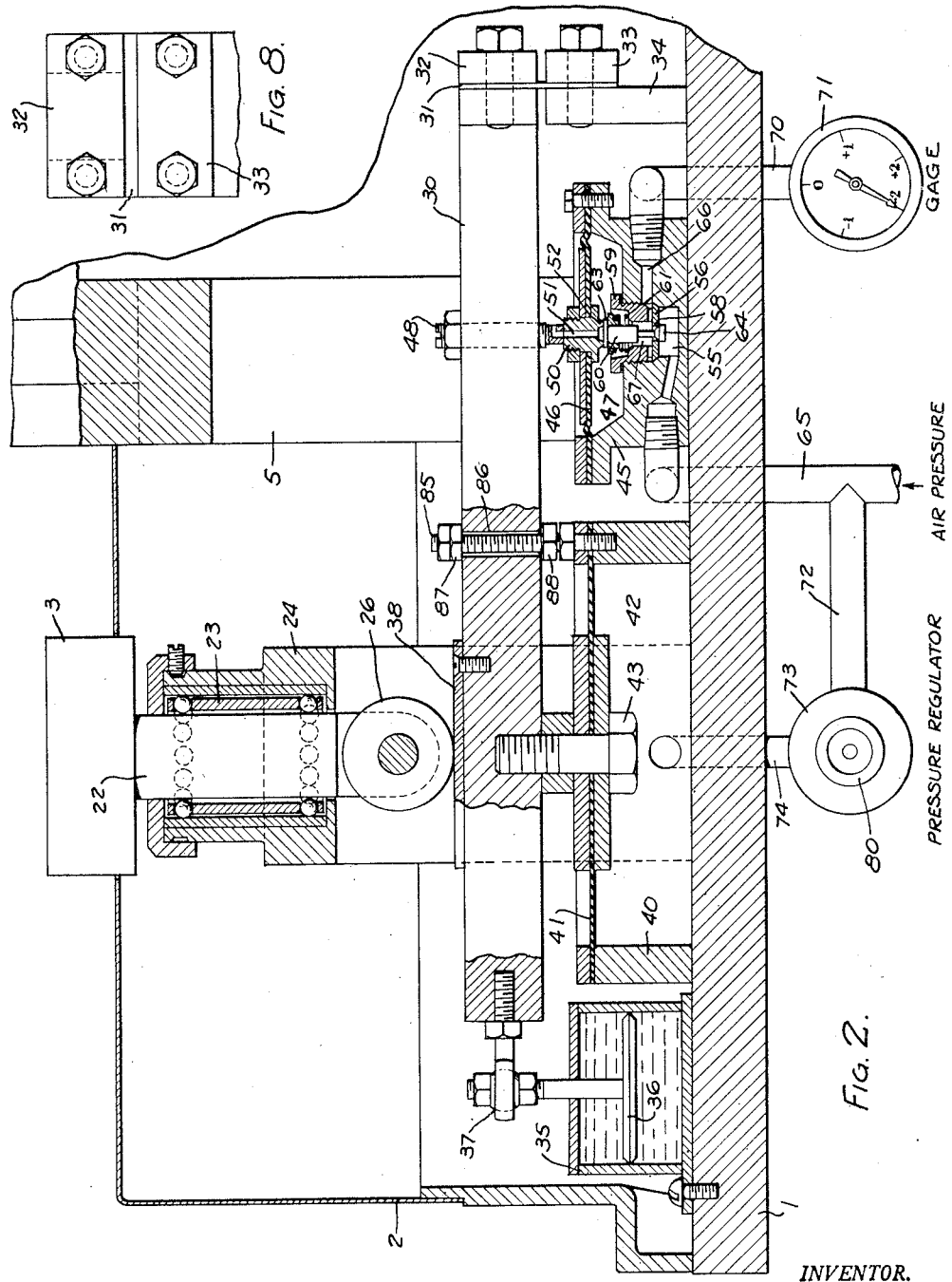

Patented Oct. 14, 1952

2,613,925

UNITED STATES PATENT OFFICE 2,613,925

PNEUMATIC LOAD INDICATING DEVICE

Milton N. Weber, Detroit, Mich., assignor of one-half to Herbert W. Link, Detroit, Mich.

Application February 1, 1952, Serial No. 269,519

12 Claims. (Cl. 265—47)

This invention relates to a load indicating device and particularly one where the resistance to the load placed on the device is provided pneumatically.

One purpose of the invention is to provide a load indicator which is particularly useful in testing or gauging resilient work pieces. The resilient work pieces may be in the form of springs, yieldable elements such as piston rings, shock absorber devices, rubber engine mounts and the like. For example, it may be the desire to test coil springs wherein each spring should exert a determined force when it is flexed a determined amount. The device of the present invention has a support or platform for receiving the work, the position of which remains substantially fixed irrespective of the load placed upon it. When a coil spring is placed on the support and then is compressed by a pressure head, which can be set to move toward the support to a fixed distance, the spring should exert the determined force, with permitted tolerances, and the fact that the platform remains in a fixed position removes the factor of a moving platform from the system.

The device can be arranged as desired to give a plus or minus reading and it also may be arranged to register the total weight on the platform. Thus, the device may not only be used in conjunction with resilient work pieces but may be employed in the nature of a scale for indicating the total load on the platform.

In carrying out the invention, the load is supported primarily by a relatively large size pneumatic unit and it may be supplemented by a smaller pneumatic unit so arranged as to control or influence air under pressure which is introduced into the larger unit to support the load. The accompanying drawings show a device and systems constructed in accordance with the invention.

Fig. 2 is an enlarged cross sectional view taken substantially on line 2—2 of Fig. 1 showing the load supporting mechanism.

Fig. 8 is a detailed view showing a fulcrum structure.

Figure 1:
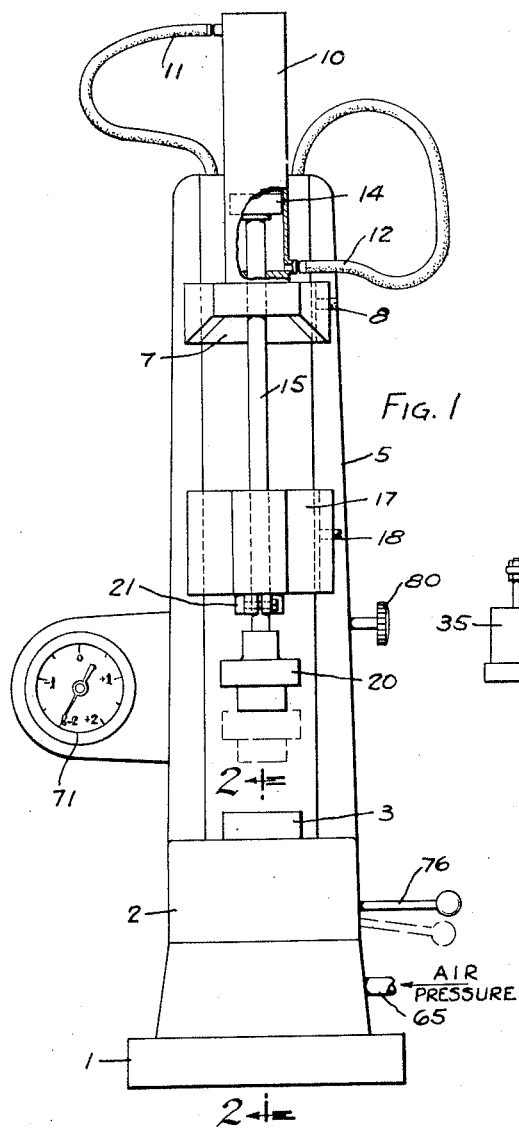
Fig. 1 is a front elevational view of a device constructed in accordance with the invention, with some parts cut away, the device having a post or standard with means for applying a load to a resilient work piece.
Figure 5:
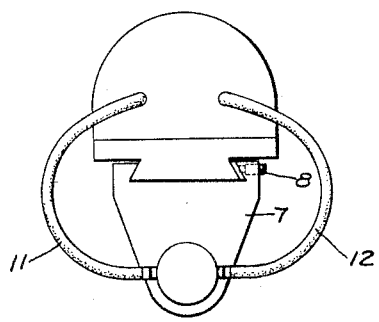
Fig. 5 is a top plan view of the device shown in Fig. 1.

In Fig. 1 the device is shown as having a suitable base 1 which supports a housing 2 through which a load supporting device or platform 3 extends, as shown in Fig. 2. Rising from the base is a post 5 which has a head 7 adjustably mounted thereon so that it may be shifted upwardly and downwardly and so that it may be set in position by means of set screw 8 (Fig. 5). This head carries operating means shown as in the form of a cylinder 10 to which fluid under pressure, such as compressed air, may be introduced through conduits 11 and 12. In the cylinder is a piston 14 which has a depending piston rod 15 which is slidable in a head 17 in turn mounted for sliding movement on the post and capable of being set in position by set screw 18.

The piston rod has a load applying device 20 on its lower end and a collar 21. It will be obvious that when air pressure enters the cylinder through conduit 11 and discharges through conduit 12, the piston is lowered in its cylinder and the lower limit may be when the piston 14 strikes the lower end of the cylinder. When air is entered through conduit 12 and exhausts through conduit 11 the piston is elevated and the upper limit is determined by the collar 21 striking the underside of the head 17. In this action the load applying head 20 shifts to and from the full and dotted line positions shown in Fig. 1.

Figure 6:
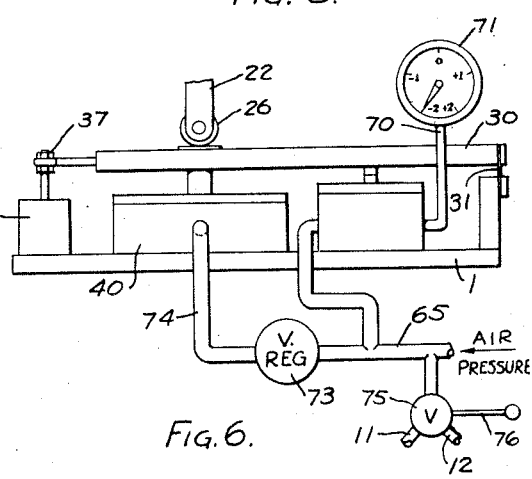
Fig. 6 is a diagrammatic view illustrating one arrangement of the system for indicating plus or minus situations.

The load supporting mechanism and compressed air system are shown in Fig. 2. The system illustrated in Fig. 2 is shown more fully diagrammatically in Fig. 6. The platform 3 has stud portion 22 mounted for free axial reciprocation in a suitable bearing 23 carried in the top of a post 24 which is supported by the base 1 as indicated. The lower end of the stud 22 is shown as being provided with a roller 26. There is a lever 30 which has one end mounted on a fulcrum. The fulcrum is shown as being in the form of a flexible plate 31 held by clamping means 32 to the lever and by clamping means 33 to a bracket 34. The flexing of the flexible member permits the lever to rock. The opposite end of the lever is preferably associated with a dash pot shown as in the form of a cylinder 35 with a piston 36 therein, the piston being connected to the lever as at 37. The cylinder or chamber 35 is to have a quantity of liquid therein.

The roller 26 engages a hardened plate 38 on the lever and underneath the lever, to support any load thereon, is an air chamber constituted by a wall 40 and a diaphragm 41. This forms a closed chamber 42. The diaphragm is connected as by means of a bolt 43 to the lever.

There is a second air chamber constituted by a body portion 45 and a diaphragm 46 providing a chamber 47. This diaphragm is connected to the lever by a bolt 48. The diaphragm 46 carries a nut or fitting 50 having an vent passage 51 therein and a valve seat 52.

The body 45 is formed with an air passage 55 and it has an insert member 56 with a port 58 therein. A fitting 59 is carried by the body 45 and it has a valving member 60 urged upwardly as Fig. 2 is viewed by a coil spring 61. The valving member has a valve portion 63 arranged to seat on the valve seat 52 of member 50. It also has a valve head 64 arranged to seat and close the port 58, the valve head 64 being on the underside of the insert 56 as shown.

Air is supplied under pressure through a supply pipe 65 which connects into the chamber 55. The body 45 has a passage 66 which connects into the chamber 47 through passage 67 in fitting 59 around the valving member 60. A suitable conduit 70 extends from the chamber 66 to a gauge 71. Air pressure is also supplied through conduit 72 and through a pressure regulator valve 73 into the chamber 42 as by means of conduits 74.

The supply line 65 also extends to a control valve 75 (Fig. 6) which has a control handle 76 and from which extends the conduits 11 and 12 which extend to the cylinder 10. The control valve is of a type known to those versed in the art, and when the lever 76 is in the full line position shown in Fig. 1 air is introduced into the cylinder through line 12 and the cylinder exhausted through line 11 and when the control valve handle is moved to the dotted line position, air is introduced into the cylinder 10 through conduit 11 and the cylinder exhausts through condit 12. The pressure regulator valve is of the variable type and has a regulator knob 80.

Figures 3, 4:
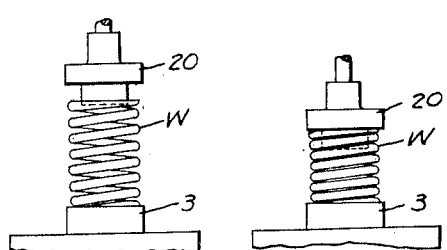
Fig. 3 is a view illustrating the load support or platform with a spring work piece thereon preliminary to the testing of the work piece.
Fig. 4 is a view similar to Fig. 3 showing the testing position.

The system as thus far described is one for the taking of plus or minus readings. A work piece, such as the spring W, may be placed upon the support 3 as shown in Fig. 3. The operator then manipulates the control valve handle 76 for the entrance of compressed air into the upper end of cylinder 10. Suppose, for example, that the work spring W should exert a fifty pound load when compressed to the distance as shown in Fig. 4. The head 7 is set so that when the piston 14 is in its lowermost position, the desired distance is attained between the support 3 and the head 20. The compressed air in chamber 42 is designed to overcome or resist the major portion of the load. The arrangement may be such that the pressure regulator valve admits, for example, air pressure in the chamber 42 sufficient to support 45 pounds of the load on the support 3. This air will not support the entire load and, therefore, the lever 30 shifts downwardly slightly with the result that the valve head 64 opens port 58 and air enters the chamber 47. The lever 30 is shifted back to its initial position when there is an exact balance and the head 64 closes port 58. If the load exerted by the spring is exactly fifty pounds it will take sufficient air pressure in the chamber 47 to overcome the five pounds in excess of that which the air in chamber 42 can resist. The exact poundage in chamber 47 may vary with different setups because of the differential leverage advantages. At any rate, the pressure in chamber 47 is usually relatively light as compared to pressure in chamber 42. Under these conditions the hand of the gauge 71 will come to rest at the zero mark. If the spring is heavy it will take a higher pressure in chamber 47 to balance the load and the hand of the gauge 71 will move to the plus side of the zero position. If the spring is light the hand of gauge 70 will not reach the zero mark but will show a minus condition. With the arrangement an operator can quickly see whether or not the spring is within the allowed tolerances of the desired fifty pounds. Of course, the above figures are merely exemplary. For different classes of work, the pressure regulator valve 73 may be easily adjusted by its handle 80 so that lighter or heavier springs or work pieces may be gauged.

After one work piece has been gauged, the valve handle 76 is shifted back to the full line position thus raising the load applying head 70 so that the work can be removed. When this occurs the load is taken off the lever 30 and it tends to move upwardly. The valve seat 52 moves off of the valve piece 63 and the chamber 47 is vented through the exhaust port 51. Air pressure is supplied continuously to the chamber 42 and to the chamber 55 but chamber 55 is now closed by the valve head 64. With this arangement, only a relatively small volume of air is expended in the testing of each work piece, there being no continued supply and exhaust for the large chamber 42.

The movement of the arm is preferably limited and this may be done by means of a screw or stud 85 which may be an extension of a cap screw, holding the diaphragm 41 in place. The screw or stud passes through an opening 86 in the lever arm 30 and is provided with a nut 87 above the arm and a nut 88 below the arm. The movement at this point may be only about .003 of an inch. Thus when the load is relieved while maintaining the pressure in the large chamber, the upward movement of the arm is stopped by the nut 87. Downward movement of the arm is limited by the nut 88 if an excess load should be placed suddenly upon the support. The valves 64 and 52 are operative between these two limits.

Figure 7:
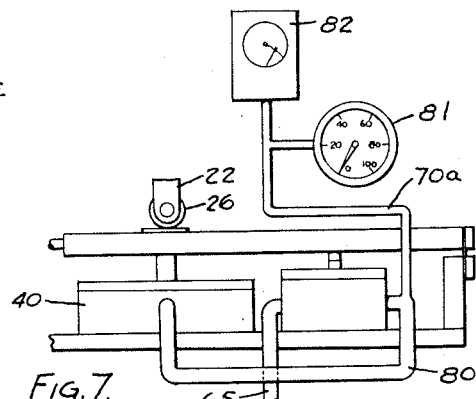
Fig. 7 is a diagrammatic view similar to Fig. 6 showing an arrangement for indicating total load applied to the platform.

Fig. 7 shows an arrangement for indicating the total weight applied to the platform. In this arrangement the structures of the air chambers 42 and 47 and the valving for the chamber 47 remains the same. The air supply line 65 connects to the chamber 55 as shown in Fig. 2. However, a conduit 80 connects with passage 66 and is directly connected into the chamber provided by the member 40. Thus when a load is placed on the platform and it is depressed, the port 58 is opened and air passes therethrough into the chamber 47 and also through conduit 80 and into the chamber 42 until there is a balanced condition and port 58 is closed by the raising of the lever 30. Thus, the pressure in both the chamber 47 and the chamber 42 is the same in this instance. The pressure in the system may then be indicated by a gauge 81 connected into the line 80 by a conduit 70a. If desired, a recorder of any selected type, as shown at 82, may be connected into the line 70a. In this way, successive work pieces may be placed on the platform and the total weight indicated and the weight of succesive work pieces recorded. Of course, when the device is used in this last described manner, the load applying device 20 is not employed.

I claim:

1. A load indicating device comprising, a support for receiving a load, a chamber for receiving air under pressure and having a relatively large movable element arranged to support the major portion of the load, a second chamber for receiving air under pressure and having a relatively small movable element arranged to support the minor portion of the load, the second chamber being adapted to be connected to a source of air under pressure, an air inlet valve operable by the movement of the movable element of the second chamber to admit air under pressure when a load is placed upon the support, and operable to closed position when air under pressure has been admitted to balance the load, so that the balancing air pressure may be gauged to ascertain the load, and an exhaust valve operable by the movement of the movable element of the second chamber to exhaust air when a load is removed from the support.

2. A load indicating device comprising, a support for receiving a load, a chamber for receiving air under pressure and having a relatively large movable element arranged to support the major portion of the load, a second chamber for receiving air under pressure and having a relatively small movable element arranged to support the minor portion of the load, the second chamber being adapted to be connected to a source of air under pressure, an air inlet valve operable by the movement of the movable element of the second chamber to admit air under pressure when a load is placed upon the support, and operable to closed position when air under pressure has been admitted to balance the load, so that the balancing air pressure may be gauged to ascertain the load, an exhaust valve operable by the movement of the movable element of the second chamber to exhaust air when a load is removed from the support, and means for positively restricting the movement of the movable elements within narrow limits irrespective of the load placed on the support.

3. A load indicating device comprising, a support for receiving a load, a chamber for receiving air under pressure and having a movable element arranged to support a portion of the load, a second chamber for receiving air under pressure and having a movable element arranged to support the remaining portion of the load, the second chamber being adapted to be connected to a source of air under pressure, an air inlet valve operable by the movement of the movable element of the second chamber to admit air under pressure when a load is placed upon the support, and operable to closed position when air under pressure has been admitted to balance the load, so that the balancing air pressure may be gauged to ascertain the load, and an exhaust valve operable by the movement of the movable element of the second chamber to exhaust air when a load is removed from the support.

4. A load indicating device comprising a support for receiving a load, a chamber for receiving air under pressure and having a relatively large movable element arranged to support the major portion of the load, said chamber adapted to be maintained with substantially constant air pressure therein, a second chamber for receiving air under pressure and having a relatively small movable element arranged to support the minor portion of the load, said second chamber being adapted to be connected to a source of air under pressure, an air inlet valve and an air exhaust valve operable by the movement of the movable element of the second chamber, the inlet valve being actuated to admit air into the second chamber when a load is placed upon the support for the entrance of air to bring about a load balancing condition so that the pressure of the air in the second chamber may be gauged to ascertain the load, the exhaust valve being operable by the movement of the movable element of the second chamber to exhaust air from the second chamber when the load is removed from the support.

5. A load indicating device comprising a support for receiving a load, a chamber for receiving air under pressure and having a relatively large movable element arranged to support the major portion of the load, said chamber adapted to be maintained with substantially constant air pressure therein, a second chamber for receiving air under pressure and having a relatively small movable element arranged to support the minor portion of the load, said second chamber being adapted to be connected to a source of air under pressure, an air inlet valve and an air exhaust valve operable by the movement of the movable element of the second chamber, the inlet valve being actuated to admit air into the second chamber when a load is placed upon the support for the entrance of air to bring about a load balancing condition so that the pressure of the air in the second chamber may be gauged to ascertain the load, the exhaust valve being operable by the movement of the movable element of the second chamber to exhaust air from the second chamber when the load is removed from the support, and means for positively restricting the movement of the movable element of the first chamber within narrow limits irrespective of the load placed on the support.

6. A load indicating device comprising, a support for receiving a load, a chamber for receiving air under pressure and having a relatively large movable element arranged to support the major portion of the load, a second chamber for receiving air under pressure and having a relatively small movable element arranged to support the minor portion of the load, the second chamber adapted to be connected to a source of air under pressure, an air inlet valve between the source of supply and the second chamber and operable to admit air into the second chamber when a load is placed upon the support, conduit means connecting the second chamber to the first chamber, so that air enters the chambers incident to a load on the support to balance the load so that the pressure may be gauged to ascertain the load, and an exhaust valve operable by movement of the movable element of the second chamber arranged to exhaust air from the said chambers when the load is removed from the support.

7. A load indicating device comprising, a support for receiving a load, a chamber for receiving air under pressure and having a movable element arranged to support a portion of the load, a second chamber for receiving air under pressure and having a movable element arranged to support the remaining portion of the load, the second chamber adapted to be connected to a source of air under pressure, an air inlet valve between the source of supply and the second chamber and operable to admit air into the second chamber when a load is placed upon the support, conduit means connecting the second chamber to the first chamber, so that air enters the chambers incident to a load on the support to balance the load so that the pressure may be gauged to ascertain the load, and an exhaust valve operable by movement of the movable element of the second chamber arranged to exhaust air from the said chambers when the load is removed from the support.

8. A load indicating device comprising, a lever having a fixed fulcrum, a support for receiving a load and for transmitting the load to the lever, a chamber for receiving air under pressure and having a movable element associated with the lever for supporting a part of the load, a second chamber for receiving air under pressure and having a movable element associated with the lever to support the remaining portion of the load, the second chamber being adapted to be connected to a source of air under pressure, an air inlet valve operable by movement of the movable element of the second chamber to admit air under pressure from the source and into the second chamber when a load is placed upon the support to establish a condition where the air under pressure balances the load, whereby the pressure in the second chamber may be gauged to ascertain the load, and an exhaust valve operable by movement of the movable element of the second chamber to exhaust air when a load is removed from the support.

9. The load indicating device as described in claim 8 characterized in that there is means for positively restricting the movement of the lever within narrow limits irrespective of the load placed on the support.

10. The load indicating device as described in claim 8 characterized in that there is means for maintaining the first named chamber under constant air pressure sufficient to support a part of the load whereby the air under pressure introduced into the second chamber supports the remaining part of the load at a balanced condition.

11. The load indicating device as described in claim 8 characterized in that there is means for maintaining the first named chamber under constant air pressure sufficient to support a part of the load whereby the air under pressure introduced into the second chamber supports the remaining part of the load at a balanced condition, and further characterized in that there is means for positively restricting the movement of the lever within narrow limits irrespective of the load on the support.

12. The load indicating device as described in claim 8 characterized in that the first chamber is relatively large and has a relatively large movable element for supporting the major portion of the load, and wherein the second chamber has a relatively small movable element arranged to support the minor portion of the load.

MILTON N. WEBER.

No references cited.